US010604179B2

(12) United States Patent
Spranger

(10) Patent No.: US 10,604,179 B2
(45) Date of Patent: Mar. 31, 2020

(54) MACHINE STABILITY CONTROL SYSTEM

(71) Applicant: Danfoss Power Solutions, Inc., Ames, IA (US)

(72) Inventor: Brian Spranger, Brooklyn Park, MN (US)

(73) Assignee: DANFOSS POWER SOLUTIONS INC., Ames, IA (US)

( * ) Notice: Subject to any disclaimer, the term of this patent is extended or adjusted under 35 U.S.C. 154(b) by 280 days.

(21) Appl. No.: 15/493,260

(22) Filed: Apr. 21, 2017

(65) Prior Publication Data

US 2018/0304924 A1     Oct. 25, 2018

(51) Int. Cl.
*B62D 6/04* (2006.01)
*G01C 21/18* (2006.01)

(52) U.S. Cl.
CPC ............. *B62D 6/04* (2013.01); *G01C 21/18* (2013.01)

(58) Field of Classification Search
CPC ......... B62D 6/04; B62D 11/003; G01C 21/18
USPC .......................................................... 701/41
See application file for complete search history.

(56) References Cited

U.S. PATENT DOCUMENTS

2012/0151339 A1*  6/2012  Zhang ................... G06F 3/016
715/702

FOREIGN PATENT DOCUMENTS

WO         2007095735 A1    8/2007
WO     WO 2007/095735 A1 *  8/2007  ............ B60W 40/10

OTHER PUBLICATIONS

European Search Report for Serial No. EP 18 16 0358 dated Sep. 17, 2018.

* cited by examiner

*Primary Examiner* — Paula L Schneider
(74) *Attorney, Agent, or Firm* — McCormick, Paudling & Huber PLLC

(57) ABSTRACT

According to the present disclosure, a system and method for providing stability control to a machine includes generating a yaw signal at a gyroscope disposed on the machine and receiving the yaw signal at a controller in communication with the gyroscope. The controller is also in communication with a user input that generates control signals for driving at least one plant of the machine. The controller is configured to alter the control signals provided to the at least one plant from the user input based at least in part on the yaw signal.

19 Claims, 4 Drawing Sheets

MACHINE STABILITY CONTROL SYSTEM

TECHNICAL FIELD

The present disclosure relates to machines with steering systems.

BACKGROUND

Machines, such as off-highway vehicles, include systems for both driving and steering the machines across terrain. These systems may include separate dedicated propel and steering systems or propel systems that also serve as steering systems, for example, in the case of dual path (dual track) vehicles. Absent operator correction, machines with certain propel systems, particularly those used in off-highway applications, tend to not drive straight because of environmental stimuli such as terrain deviations and/or external forces acting on the machine. For example, loose or wet surfaces, piles of dirt, sloped surfaces, and/or other similar environmental stimuli may cause a machine intending to follow a straight path to unintentionally deviate from said straight path, thereby requiring an operator of the machine to correct for the deviation.

SUMMARY

According to the present disclosure, a stability control system for a machine may comprise a gyroscope, disposed on the machine, and a controller. The controller is in communication with the gyroscope and a user input that generates control signals for driving at least one plant of the machine. The gyroscope generates a yaw signal and the controller is configured to receive the yaw signal and the control signals from the user input. The controller may alter the control signals provided to the at least one plant from the user input based at least in part on the yaw signal.

According to the present disclosure, the controller may maintain an accumulated yaw based on the yaw signal and may alter the control signal to minimize the accumulated yaw. The controller may determine the accumulated yaw by averaging yaw signals received from the gyroscope over a time period. The controller may also determine the accumulated yaw by accumulating only yaw signals received from the gyroscope over the time period that exceed a cut-off threshold.

According to the present disclosure, the controller may determine whether the control signal from the user input includes a turning component and may only alter the control signals provided to the at least one plant based at least in part on the yaw signal when the control signal from the user input does not include a turning component.

According to the present disclosure, the gyroscope and the controller may be disposed in a single housing on the machine. The gyroscope may also be connected to the controller over a CAN bus and the controller may include a PID controller.

According to the present disclosure, a method for providing stability control to a machine may comprise receiving an input signal from a user input of the machine commanding a machine movement, providing a control signal to at least one plant of the machine in response to the input signal, receiving a yaw signal from a gyroscope associated with the machine, and altering the control signal provided to the at least one plant based at least in part on the yaw signal.

According to the present disclosure, the method may additionally comprise monitoring accumulated yaw of the machine with the gyroscope. Monitoring accumulated yaw may include averaging yaw signals received from the gyroscope over a time period. According to the present disclosure, altering the control signal provided to the at least one plant based at least in part on the yaw signal may include minimizing the accumulated yaw.

According to the present disclosure, the method may additionally comprise determining whether the input signal commands straight tracking of the machine, and altering the control signal provided to the at least one plant based at least in part on the yaw signal only when the input signal commands straight tracking of the machine.

According to the present disclosure, the machine may be a dual path machine having at least two plants and altering the control signal based at least in part on the yaw signal may comprise providing control signals that are different to the at least two plants.

According to the present disclosure, a machine may comprise a body and at least one plant configured to propel the body over a surface. A user input may generate control signals for driving the at least one plant and a gyroscope, disposed on the body, may generate a yaw signal. The machine may comprise a controller in communication with the gyroscope and the user input, the controller being configured to receive the yaw signal from the gyroscope and the control signals from the user input and to alter the control signals provided to the at least one plant from the user input based at least in part on the yaw signal.

According to the present disclosure, the controller of the machine may maintain an accumulated yaw based on the yaw signal and may alter the control signal to minimize the accumulated yaw. The controller may determine the accumulated yaw by averaging values of the yaw signal received from the gyroscope over a time period. The controller may also determine the accumulated yaw by accumulating only values of the yaw signal received from the gyroscope over the time period that exceed a cut-off threshold.

According to the present disclosure, the controller of the machine may determine whether the control signal from the user input includes a turning component and may only alter the control signals provided to the at least one plant based at least in part on the yaw signal when the control signal from the user input does not include a turning component.

According to the present disclosure, the gyroscope and the controller may be disposed in a single housing on the machine. The machine may also comprise a CAN bus interconnecting the at least one plant, the user input, the gyroscope, and the controller.

These and other objects, features and advantages of the present disclosure will become apparent in light of the detailed description of embodiments thereof, as illustrated in the accompanying drawings.

DETAILED DESCRIPTION

Before the various embodiments are described in further detail, it is to be understood that the invention is not limited to the particular embodiments described. It will be understood by one of ordinary skill in the art that the controller and systems described herein may be adapted and modified as is appropriate for the application being addressed and that the controller and systems described herein may be employed in other suitable applications, and that such other additions and modifications will not depart from the scope thereof.

Figure 1:
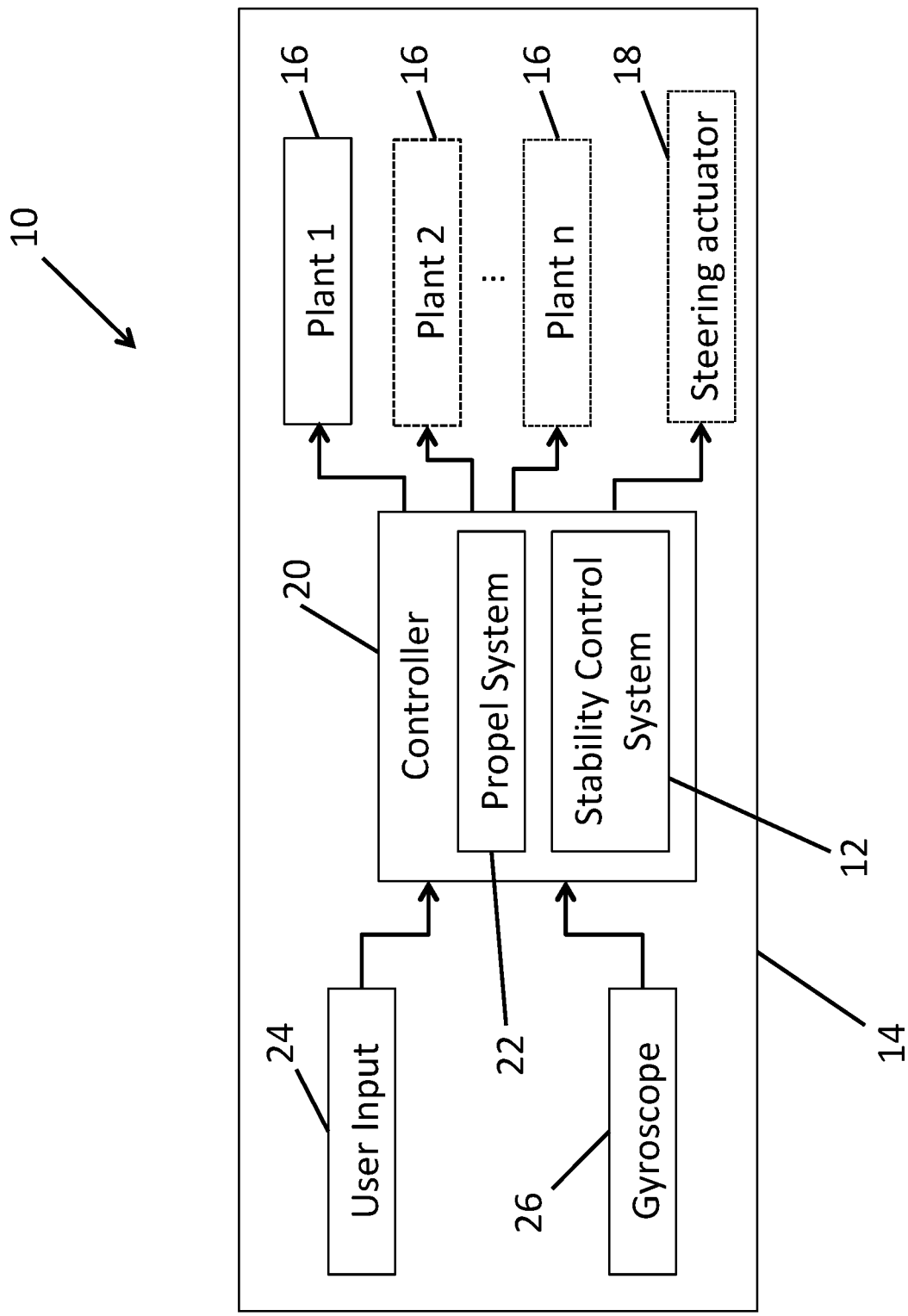
FIG. 1 is a schematic diagram of a machine comprising the stability control system according to the present disclosure.

Referring to FIG. 1, a machine 10 including a stability control system 12 according to the present disclosure is shown. The machine 10 may be any vehicle with a steering system, including single path (single track) and dual path (dual track) vehicles. For example, the machine may be an off-highway vehicle such as a skid steer, tractor, fork lift, bulldozer, backhoe, crane, cherry picker, all-terrain vehicle or the like.

The machine 10 includes a body 14 and at least one plant 16 operatively coupled to one or more wheels, treads, and/or other similar driving elements for propelling the body 14 across terrain. In some applications, such as where the machine 10 is a dual path vehicle, the machine 10 may include at least two plants 16 that also provide the steering system of the machine 10 in addition to providing propulsion. In other applications, such as where the machine is a single path vehicle, the machine 10 may include a steering system with a dedicated steering actuator 18 for steering the machine 10, while the at least one plant 16 provides propulsion. The at least one plant 16 and/or the steering actuator 18 may include mechanical and/or hydraulic propulsion and steering systems, or combinations thereof.

The machine also includes a controller 20, including a propel system 22 and the stability control system 12, a user input 24 and a gyroscope 26 disposed on or in the body 14. The user input 24 and gyroscope 26 are operatively connected to the controller 20 to provide input to the propel system 22 and stability control system 12, respectively, allowing the controller 20 to command the at least one plant 16 and, optionally, the steering actuator 18, to drive and steer the machine 10 with stabilized tracking control according to the present disclosure.

The user input 24 may be any suitable control for imparting drive and/or steering movement to the machine 10 including any known operator control for the various machines listed above. For example, the user input 24 may include a steering wheel, one or more joysticks, pedals, or any other similar operator controls.

The controller 20, at least one plant 16, optional steering actuator 18, user input 24, and gyroscope 26, as well as other various subsystems of the machine 10, may be connected to one another over a Controller Area Network (CAN or CAN bus) or other similar network that allows the controller 20, at least one plant 16, steering actuator 18, user input 24, gyroscope 26, and various other subsystems, microprocessors, and/or any other devices connected to the CAN or other similar network to communicate with one another using CAN or other communication protocols known in the art.

The controller 20 includes all of the necessary electronics, software, memory, storage, databases, firmware, logic/state machines, microprocessors, communication links, and any other input/output interfaces to perform the functions described herein and/or to achieve the results described herein. For example, the controller 20 may include, or be in communication with, one or more processors and memory, which may include system memory, including random access memory (RAM) and read-only memory (ROM). Suitable computer program code may be provided to the controller 20 for executing numerous functions, including those discussed in connection with the stability control system 12 and propel system 22.

The one or more processors may include one or more conventional microprocessors and may also include one or more supplementary co-processors such as math co-processors or the like. The one or more processors may be configured to communicate with other networks and/or devices such as servers, other processors, computers, cellular telephones, tablets and the like.

The one or more processors may be in communication with the memory, which may comprise magnetic, optical and/or semiconductor memory, such as, for example, random access memory ("RAM"), read only memory ("ROM"), flash memory, optical memory, or a hard disk drive memory. Memory may store accumulated yaw detected by the gyroscope 26 for use by the stability control system 12 in providing stability control according to the present disclosure. The memory may also store any other data and/or information typically found in computing devices, including an operating system, and/or one or more other programs (e.g., computer program code and/or a computer program product) that are stored in a non-transitory memory portion and adapted to direct the controller 20 to perform according to the various embodiments discussed herein. The propel system 22, stability control system 12, and/or portions thereof, and/or any other programs may be stored, for example, in a compressed format, an uncompiled and/or an encrypted format, and may include computer program code executable by the one or more processors. The executable instructions of the computer program code may be read into a main memory of the one or more processors from a non-transitory computer-readable medium other than the memory. While execution of sequences of instructions in the program causes the one or more processors to perform the process steps described herein, hard-wired circuitry may be used in place of, or in combination with, executable software instructions for implementation of the processes of the present invention. Thus, embodiments of the present invention are not limited to any specific combination of hardware and software.

For example, the methods and systems discussed herein may also be implemented in programmable hardware devices such as field programmable gate arrays, programmable array logic, programmable logic devices or the like. Programs may also be implemented in software for execution by various types of computer processors. A program of executable code may, for instance, comprise one or more physical or logical blocks of computer instructions, which may, for instance, be organized as an object, procedure, process or function. Nevertheless, the executables of an identified program need not be physically located together, but may comprise separate instructions stored in different locations which, when joined logically together, comprise the program and achieve the stated purpose for the programs such as providing workflow analysis. In an embodiment, an application of executable code may be a compilation of many instructions, which may be distributed over several different code partitions or segments, among different programs, and across several devices.

For example, although the stability control system 12 is shown in FIG. 1 as being an integral component of the controller 20, the stability control system 12 may instead be a separate component, including a stability controller housing that houses all of the necessary processors, memory, and the like to provide stability control according to the present disclosure. The separate stability control system 12 may be operatively connected to the controller 20 over the CAN bus or other similar network. Similarly, the gyroscope 26 may be a separate component disposed on the body 14 of the machine 10 or may be integrated with the stability control system 12, for example, in the separate stability controller housing that connects to the CAN bus or similar network.

The term "computer-readable medium" as used herein refers to any medium that provides or participates in providing instructions and/or data to the one or more processors of the controller 20 (or any other processor of a device described herein) for execution. Such a medium may take many forms, including but not limited to, non-volatile media or memory and volatile memory. Non-volatile memory may include, for example, optical, magnetic, or opto-magnetic disks, or other non-transitory memory. Volatile memory may include dynamic random access memory (DRAM), which typically constitutes the main memory or other transitory memory.

Figure 2:
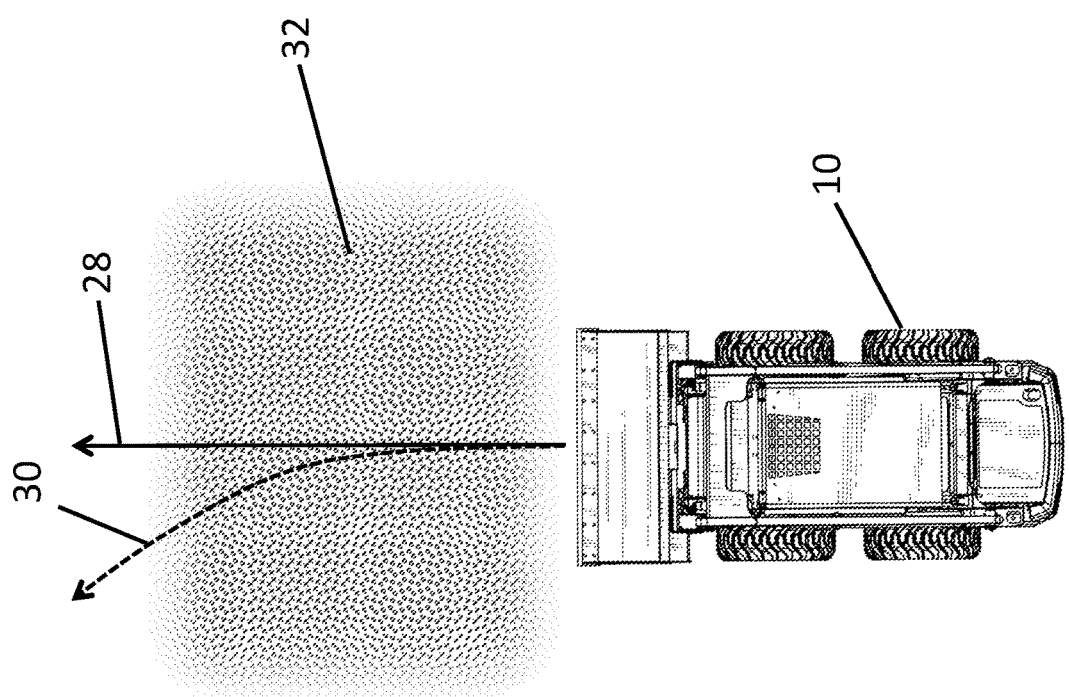
FIG. 2 is a top view of the machine of FIG. 1 operating over terrain.

Referring to FIG. 2, the stability control system 12, shown in FIG. 1, is implemented with the controller 20, shown in FIG. 1, to stabilize straight tracking of the machine 10. Thus, when the machine 10 is being controlled to move along a straight path 28, the machine 10 does not unintentionally deviate from the straight path 28 onto an unintended path 30 due to environmental stimuli 32, such as terrain deviations and/or external forces acting on the machine 10, which would, absent the stability control system 12 shown in FIG. 1, require operator correction in order to maintain tracking of the machine 10 along the straight path 28. Exemplary environmental stimuli 32 may include, for example, loose or wet surfaces, piles of dirt, sloped surfaces, and/or other similar environmental stimuli that could cause the machine 10 to unintentionally deviate from the straight path 28 through a loss of traction or the like.

Figure 3:
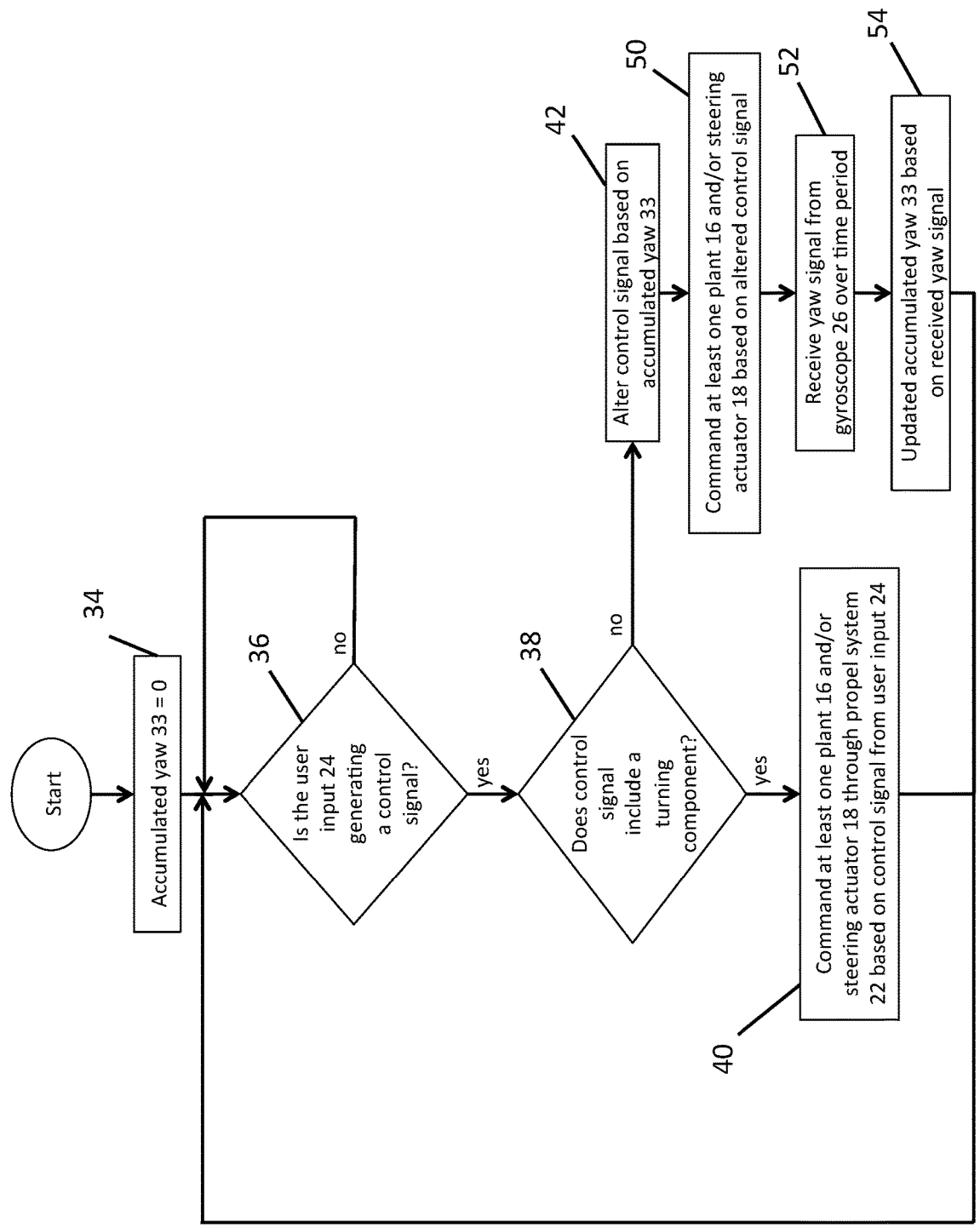
FIG. 3 is a schematic control diagram for providing stability control to the machine of FIG. 1.

Referring to FIG. 3, in operation, accumulated yaw 33 is initially set to zero, as seen in step 34, since the machine 10 is not yet in motion. The accumulated yaw 33 is an average of raw yaw data signals generated by the gyroscope 26 over a short period of time. To address signal drift common to many gyroscopes, the accumulated yaw 33 may be determined by the controller 20 using a signal cut-off threshold, with the accumulated yaw 33 being determined by accumulating only the yaw data signals over the time period that exceed the signal cut-off threshold. Thus, the signal cut-off threshold allows the controller 20 to differentiate actual rotation of the machine 10, i.e., yaw signal values above the cut-off threshold, from drift signal noise, i.e., yaw signal values below the cut-off threshold. The controller 20 may also use an average of the yaw signal values during the period of time that are below the cut-off threshold as an offset for the signal drift.

In order for the controller 20 to propel and guide the machine 10 with stabilized straight tracking, the controller 20 must first receive a control signal from the user input 24 commanding movement of the machine 10 at step 36. If a control signal has not been generated by the user input 24, the controller 20 may simply continue waiting for a control signal from the user input 24. Alternatively, if a control signal is received from the user input 24, at step 38, the controller 20 evaluates whether the control signal includes a turning component, i.e., the operator is intending to turn the machine 10, or whether the control signal is commanding the machine 10 to follow a straight track, such as the straight path 28, shown in FIG. 2. If the control signal from the user input 24 does include a turning component, it means that the operator is intending for the machine 10 to turn and, therefore, at step 40, the controller 20 may, through the propel system 22, shown in FIG. 1, command the at least one plant 16 and/or the steering actuator 18 to propel and turn the machine 10 based on the control signal from the user input 24.

Figure 4:
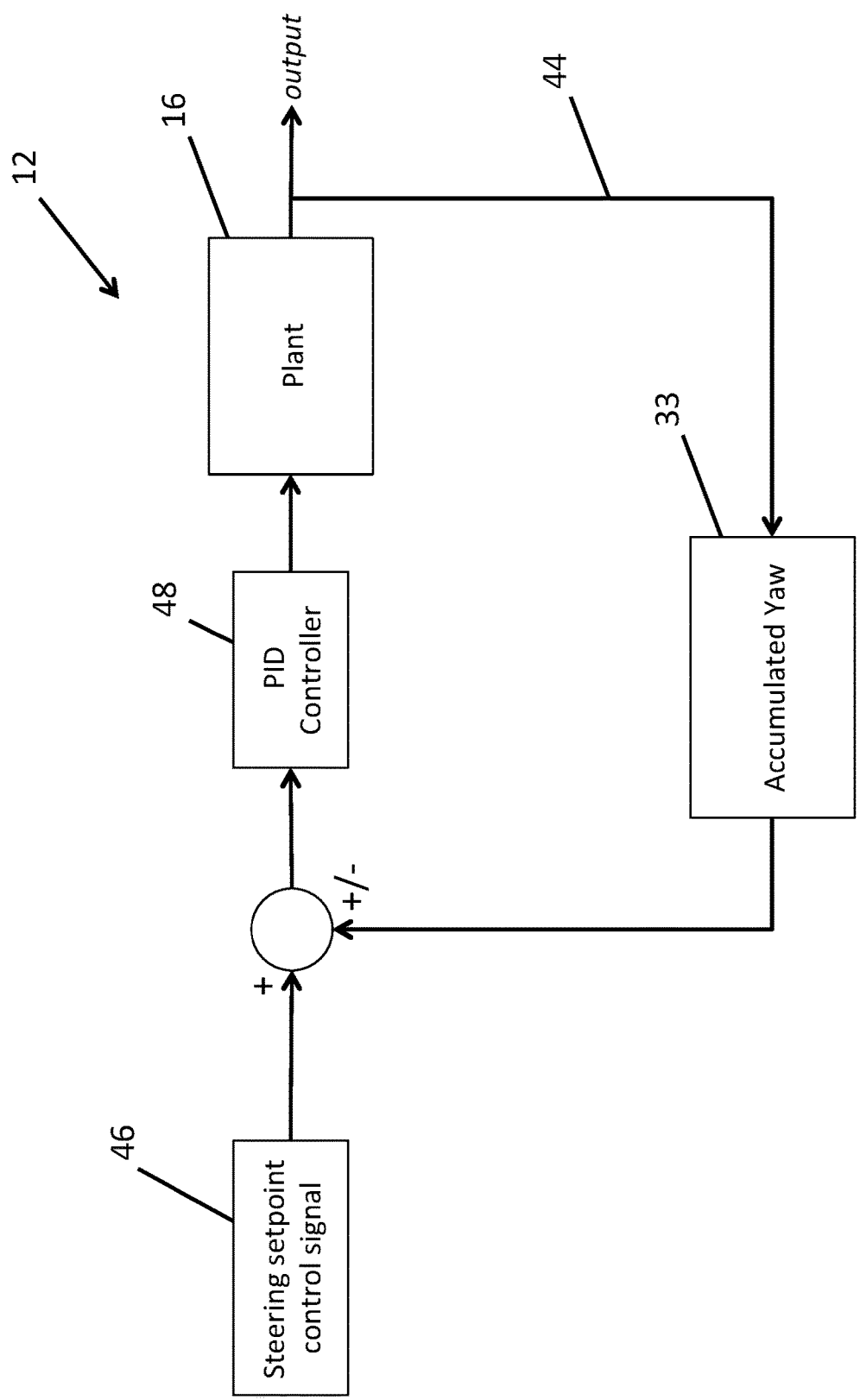
FIG. 4 is a schematic control diagram of the stability control system of the machine of FIG. 1.

Alternatively, if the controller 20 determines that the control signal from the user input 24 does not include a turning component at step 38, it means that the operator is intending to drive the machine along a straight track, such as the straight path 28, shown in FIG. 2. In this case, the controller 20 may implement stabilized straight tracking through the stability control system 12 according to the present disclosure by first, at step 42, altering the control signal received from the user input 24 based on the accumulated yaw 33. For instance, referring to FIG. 4, the stability control system 12 may include a feedback loop 44 for modifying a steering setpoint control signal 46 generated by the propel system 22, shown in FIG. 1, in response to the control signal from the user input 24, shown in FIG. 1, based on the accumulated yaw 33 as determined by a yaw signal generated by the gyroscope 26, shown in FIG. 1, as the machine 10 moves. For instance, as discussed above, the accumulated yaw 33 may be determined by the controller 20 using a signal cut-off threshold, with the accumulated yaw 33 being determined from only the yaw data signals that exceed the signal cut-off threshold, thereby allowing the controller 20 to differentiate actual rotation of the machine 10, i.e., yaw signal values above the cut-off threshold, from drift signal noise, i.e., yaw signal values below the cut-off threshold. As discussed above, the controller 20 may also use an average of the yaw signal values below the cut-off threshold to offset the signal drift. Using accumulated yaw 33 in the manner described above, rather than the raw data from the yaw signal generated by the gyroscope 26, allows the controller 20 to avoid errors in the yaw signal due to gyroscope drift, which is common to many gyroscopes. Thus, by utilizing the yaw signal from the gyroscope 26, shown in FIG. 1, during each control loop the stability control system 12 determines the accumulated yaw 33, which is indicative of steering error due to the fact that the machine 10 is being driven straight and, therefore, should not experience any yaw. Accordingly, the accumulated yaw 33 indicates how much rotation, i.e., steering error, the machine 10 has exhibited. The controller 20, shown in FIG. 1, eliminates this steering error, for example using a PID (proportional—integral—derivative) controller 48, to stabilize the tracking of the machine 10 by altering the control signal supplied to the at least one plant 16 and/or optional steering actuator 18, shown in FIG. 1, to correcting the steering based on the yaw signal by reducing the accumulated yaw 33 to zero. Each control loop, the PID controller 48 calculates the steering error as the difference between the desired steering setpoint control signal 46 and the accumulated yaw 33 as measured by the gyroscope 26, shown in FIG. 1, and applies a correction to reduce the accumulated yaw 33 to zero based on proportional, integral, and derivative terms.

Referring to back to FIG. 3, once the controller 20 alters the control signal at step 42, the controller 20 then commands the at least one plant 16 and/or the steering actuator 18 at step 50 to propel the machine 10 based on the altered control signal to propel the machine 10 along a straight track, such as the straight path 28, shown in FIG. 2. For example, if the machine 10 is a dual path machine with two hydrostatic drive systems, such as a skid steer, the controller 20 alters one and/or both of the control signals for the two drive systems relative to one another so that the speeds of transmissions of the two drive systems no longer match one another, which they would normally do for straight tracking.

This relative change between the control signals effects steering of the machine 10, without steering actually being commanded through the user input 24, to eliminate yaw of the machine 10 and maintain straight tracking, for example, along the straight path 28, shown in FIG. 2.

At step 52, the controller 20 then receives the yaw signal from the gyroscope 26, shown in FIG. 1, over the time period and, at step 54, updates the accumulated yaw 33 to provide a measurement of how much rotation the machine 10 is exhibiting, since this rotation is indicative of steering error. The controller 20 then continues to control movement and steering of the machine 10 according to method of FIG. 3.

Thus, the stability control system 12 of the present disclosure advantageously measures and eliminates yaw of the machine 10 by automatically compensating the steering command or commands sent to the drive and/or steering systems, which may be, for example, one or more hydraulic systems. Accordingly, referring back to FIG. 2, the controller 20, shown in FIG. 1, advantageously stabilizes straight tracking of the machine 10 so that when the machine 10 is following a straight track, such as the straight path 28, the machine 10 does not unintentionally deviate from the straight path 28, for example, onto the unintended path 30, due to environmental stimuli 32 acting on the machine 10, which would, absent the stability control system 12, shown in FIG. 1, require operator correction in order to maintain tracking of the machine 10 along the straight path 28.

While various embodiments have been described in the present disclosure, it will be appreciated by those of ordinary skill in the art that modifications can be made to the various embodiments without departing from the spirit and scope of the invention as a whole. For instance, while the system and method of the present disclosure has been described in connection with a gyroscope generating yaw signals, the gyroscope could be replaced with any other orientation sensor able to take yaw measurements. Accordingly, the particular embodiments described in this specification are to be taken as merely illustrative and not limiting.

What is claimed is:

1. A stability control system for a machine, the stability control system comprising:
    a gyroscope disposed on the machine, the gyroscope generating yaw signals; and
    a controller in communication with the gyroscope and a user input that generates control signals for driving at least one plant of the machine, the controller configured to receive the yaw signals from the gyroscope and the control signals from the user input;
    wherein the controller is configured to determine an accumulated yaw by averaging the yaw signals received from the gyroscope over a time period and to alter the control signals provided to the at least one plant from the user input to minimize the accumulated yaw.

2. The stability control system according to claim 1, wherein the controller is configured to maintain the accumulated yaw in a memory accessible to the controller.

3. The stability control system according to claim 2, wherein the controller is configured to maintain the accumulated yaw as a running average and to update the running average each time a new yaw signal is received from the gyroscope.

4. The stability control system according to claim 3, wherein the controller determines the accumulated yaw by accumulating only yaw signals received from the gyroscope over the time period that exceed a cut-off threshold.

5. The stability control system according to claim 1, wherein the controller determines whether the control signal from the user input includes a turning component; and
    wherein the controller only alters the control signals provided to the at least one plant to minimize the accumulated yaw when the control signal from the user input does not include a turning component.

6. The stability control system according to claim 1, wherein the gyroscope and the controller are disposed in a single housing disposed on the machine.

7. The stability control system according to claim 1, wherein the controller includes a PID controller.

8. A method for providing stability control to a machine, the method comprising:
    receiving an input signal from a user input of the machine commanding a machine movement;
    providing a control signal to at least one plant of the machine in response to the input signal;
    receiving yaw signals from a gyroscope associated with the machine;
    determining accumulated yaw of the machine by averaging the yaw signals received from the gyroscope over a time period; and
    altering the control signal provided to the at least one plant to minimize the accumulated yaw.

9. The method according to claim 8, additionally comprising:
    maintaining the accumulated yaw of the machine in a memory.

10. The method according to claim 9, wherein the accumulated yaw is maintained in the memory as a running average that is updated each time a new yaw signal is received from the gyroscope.

11. The method according to claim 8, additionally comprising:
    determining whether the input signal commands straight tracking of the machine.

12. The method according to claim 11, additionally comprising:
    altering the control signal provided to the at least one plant to minimize the accumulated yaw only when the input signal commands straight tracking of the machine.

13. The method according to claim 8, wherein the machine is a dual path machine having at least two plants and wherein altering the control signal comprises providing control signals that are different to the at least two plants.

14. A machine comprising:
    a body;
    at least one plant configured to propel the body over a surface;
    a user input that generates control signals for driving the at least one plant;
    a gyroscope disposed on the body, the gyroscope generating yaw signals; and
    a controller in communication with the gyroscope and the user input, the controller configured to receive the yaw signals from the gyroscope and the control signals from the user input, to determine an accumulated yaw by averaging the yaw signals received from the gyroscope over a time period and to alter the control signals provided to the at least one plant from the user input to minimize the accumulated yaw.

15. The machine according to claim 14, wherein the controller is configured to maintain the accumulated yaw in a memory accessible to the controller.

16. The machine according to claim 15, wherein the controller is configured to maintain the accumulated yaw as a running average and to update the running average each time a new yaw signal is received from the gyroscope.

17. The machine according to claim 16, wherein the controller determines the accumulated yaw by accumulating only values of the yaw signal received from the gyroscope over the time period that exceed a cut-off threshold.

18. The machine according to claim 14, wherein the controller determines whether the control signals from the user input include a turning component; and
    wherein the controller only alters the control signals provided to the at least one plant to minimize the accumulated yaw when the control signal from the user input does not include a turning component.

19. The machine according to claim 14, additionally comprising a CAN bus connecting the at least one plant, the user input, the gyroscope, and the controller.

\* \* \* \* \*